United States Patent [19]

Hefel et al.

[11] Patent Number: 5,563,875
[45] Date of Patent: Oct. 8, 1996

[54] WRAP-AROUND ROUTE TESTING IN PACKET COMMUNICATIONS NETWORKS

[75] Inventors: Timothy R. Hefel, Durham; Lap T. Huynh, Apex; Thomas P. McSweeney, Raleigh, all of N.C.

[73] Assignee: International Business Machines Corporation, Armonk, N.Y.

[21] Appl. No.: 500,674

[22] Filed: Jul. 10, 1995

[51] Int. Cl.⁶ ........................................... H04J 3/14
[52] U.S. Cl. ........................................ 370/15; 370/14
[58] Field of Search ......................... 370/15, 14, 13, 370/13.1; 379/5; 371/20.5

[56] References Cited

U.S. PATENT DOCUMENTS

| | | | |
|---|---|---|---|
| 4,006,320 | 2/1977 | Markl | 179/175.31 R |
| 4,486,877 | 12/1984 | Turner | 370/15 |
| 4,569,042 | 2/1986 | Larson | 370/13 |
| 4,630,268 | 12/1986 | Rodenbaugh | 371/20.5 |
| 5,010,544 | 4/1991 | Chang et al. | 370/13.1 |
| 5,343,461 | 8/1994 | Barton et al. | 370/13 |
| 5,422,876 | 6/1995 | Turudic | 370/15 |

*Primary Examiner*—Douglas W. Olms
*Assistant Examiner*—Matthew C. Phillips
*Attorney, Agent, or Firm*—Gerald R. Woods; Robert O. Nimtz

[57] ABSTRACT

A packet communications network includes a route testing system which launches a plurality of route testing messages from the source node to each of the nodes along the route, including the destination node, and returning to the source node. Time stamps in each of theses testing messages are compared to reception times to determine round trip delays which can be halved and compared to determine link transit times. These link transit times can, in turn, be analyzed to localize congestion or identify failed resources. The source resource is where the data is accumulated for the entire path and then analyzed to determine the location of failed links, if any, the response time from the source to the destination, the response time of each resource in the path, and the location of congested links. Packet switched resources identify the path test command themselves and carry out the testing procedure. Circuit switched resources utilize the control point controlling that resource to carry out the testing procedure.

21 Claims, 4 Drawing Sheets

TRANSMIT

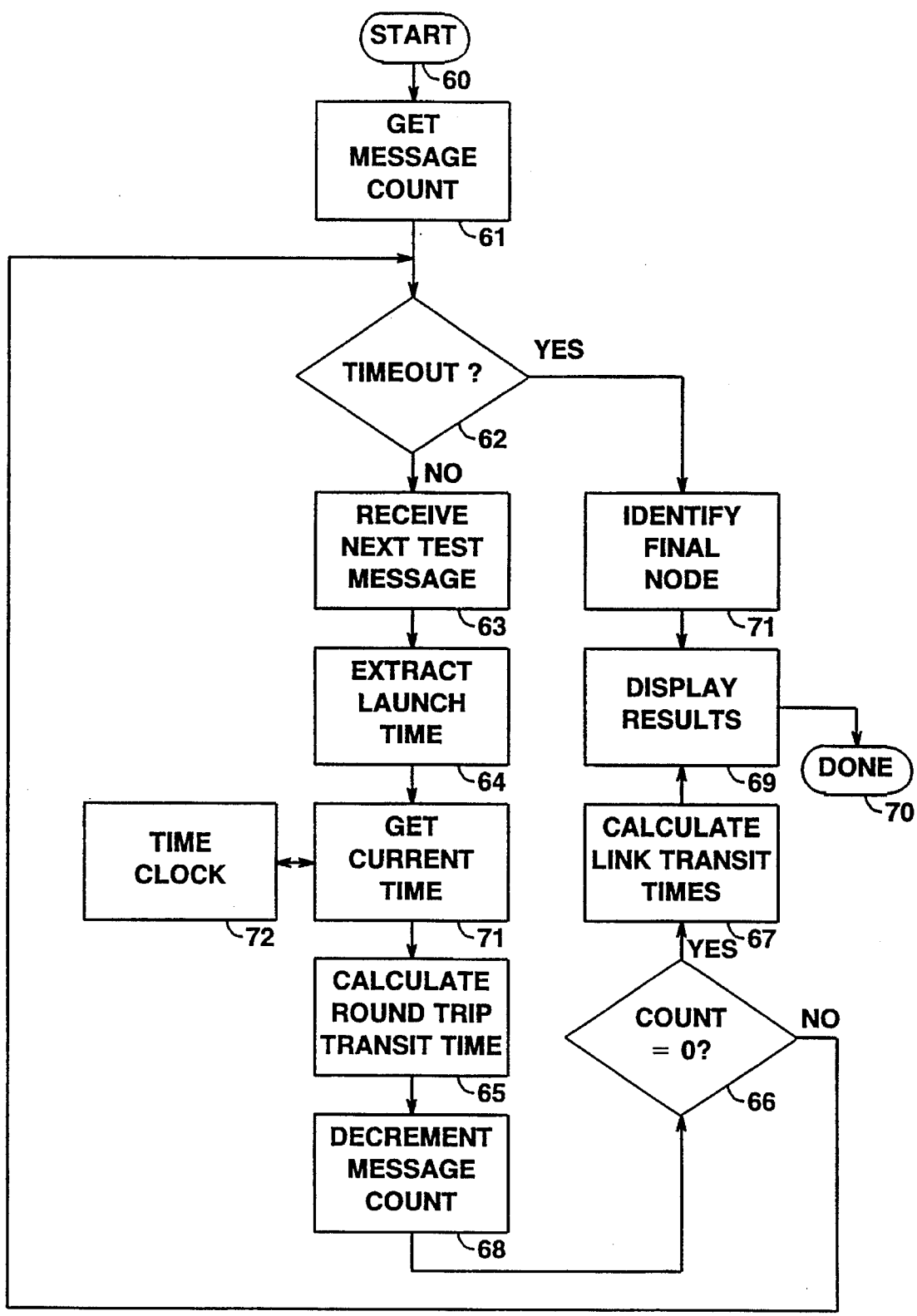

WRAP-AROUND ROUTE TESTING IN PACKET COMMUNICATIONS NETWORKS

TECHNICAL FIELD

This invention relates to packet communications systems and, more particularly, to methods and apparatus for testing individual communications paths in such systems.

BACKGROUND OF THE INVENTION

In the co-pending application of John G. Stevenson, Ser. No. 08/236,800, filed May 2, 1994, and assigned to applicants' assignee, a system is described in which a path test command is launched in a network, following a path determined in the same way as a normal data transfer from a source to a destination in a so-called connectionless network, that is, in a network in which the transmission path is not predetermined prior to the transmission of data. At each node encountered along the connection path, the path test command initiates a path test identifying that node and the current time. These results of the path test are sent back to the node initiating the path test command. Thus, as the path test command traverses the data path, a sequence of test results flow from each of the nodes encountered along the path back to the originating node. As noted in the aforementioned patent application, these results can be combined at the originating node to determine the response time of the entire path from source to destination, the response time of each leg along this path, and hence the identification of congestion points in the path. If the destination node is never reached, the returned test results serve to identify the first encountered failed transmission leg or node.

In order to implement the path test of the afore-mentioned patent application, each resource encountered along the transmission path traversed by the path test must be modified so as to properly respond to the path test command, that is, to generate the path test results, to formulate and transmit these path test results into a message, and to return this message back to the originating source node. The implementation of this prior art solution to the problem of testing data paths therefore involves the considerable modification of each and every resource included in the network, thus significantly increasing the cost and complexity of the network.

Many connection oriented (as opposed to connectionless) packet network routing mechanisms pre-calculate the path to be followed by data packets transmitted from a source node to the destination node such as that disclosed in H. Ahmadi et al. U.S. Pat. No. 5,233,604, granted Aug. 3, 1993. In one such connection oriented system, the IBM Systems Network Architecture (SNA) system, a topology data base containing current information about the state of all of the resources of the network is maintained at each node. The information in this data base is then used to calculate an optimal route between the originating node and the destination node. These routes are then saved to control the actual routing of data packets to be transmitted from this originating node along the pre-calculated route to the destination node. In order to test the route or path actually used by the data packets, some mechanism, such as SNA, is necessary to insure correspondence between the data route and the test route.

SUMMARY OF THE INVENTION

In accordance with the illustrative embodiment of the present invention, a wrap-around test is implemented in packet systems using pre-calculated routes by generating a plurality of wrap-around test messages, one for each node in the pre-calculated route. Each such wrap-around test message is directed to a different node in the pre-calculated path. The intermediate and destination nodes treat these wrap-around test messages exactly the same as data messages, and hence no modifications to these intermediate and destination nodes are required to implement the present invention. As each wrap-around test message is launched on the network, the time of launching is noted. When each wrap-around message is returned to the originating node, the reception time is noted. The transit time of that message, then, is one-half of the difference between the launching time and the reception time of a wrap-around message. The transit time of each leg of the route can then be calculated as the difference between the transit times to the two nodes immediately adjacent to that leg. Finally, the overall route delay is simply the sum of the transit times of all of the legs in that route.

As noted above, the wrap-around test of the present invention requires modifications only to the originating node utilizing the wrap-around test, and no modifications are required to the balance of the network. Not only is this a considerably simpler and cheaper implementation of route testing, but, since no special processing need be done at the immediate and destination nodes, these nodes would operate more efficiently than with the testing procedure of the afore-mentioned patent application Ser. No. 08/236,800. Moreover, a network can be gradually modified to permit route testing since nodes can be modified one-at-a-time rather than all at once as is necessary in the prior art application noted above.

Another advantage of the testing protocol of the present invention is the ability to identify bottlenecks or points of congestion in the network by noting unexpectedly large delays, or changes in delay, in certain legs of a route. Finally, failures in resources of the network can be identified by noting which nodes along the route fail to return the wrap-around test message.

BRIEF DESCRIPTION OF THE DRAWINGS

A complete understanding of the present invention may be gained by considering the following detailed description in conjunction with the accompanying drawings, in which:

FIG. 6 shows a general flow chart of the process for receiving the plurality of wrap-around test messages at the path originating node, also used in implementing the present invention.

To facilitate reader understanding, identical reference numerals are used to designate elements common to the figures.

DETAILED DESCRIPTION

Figure 1:
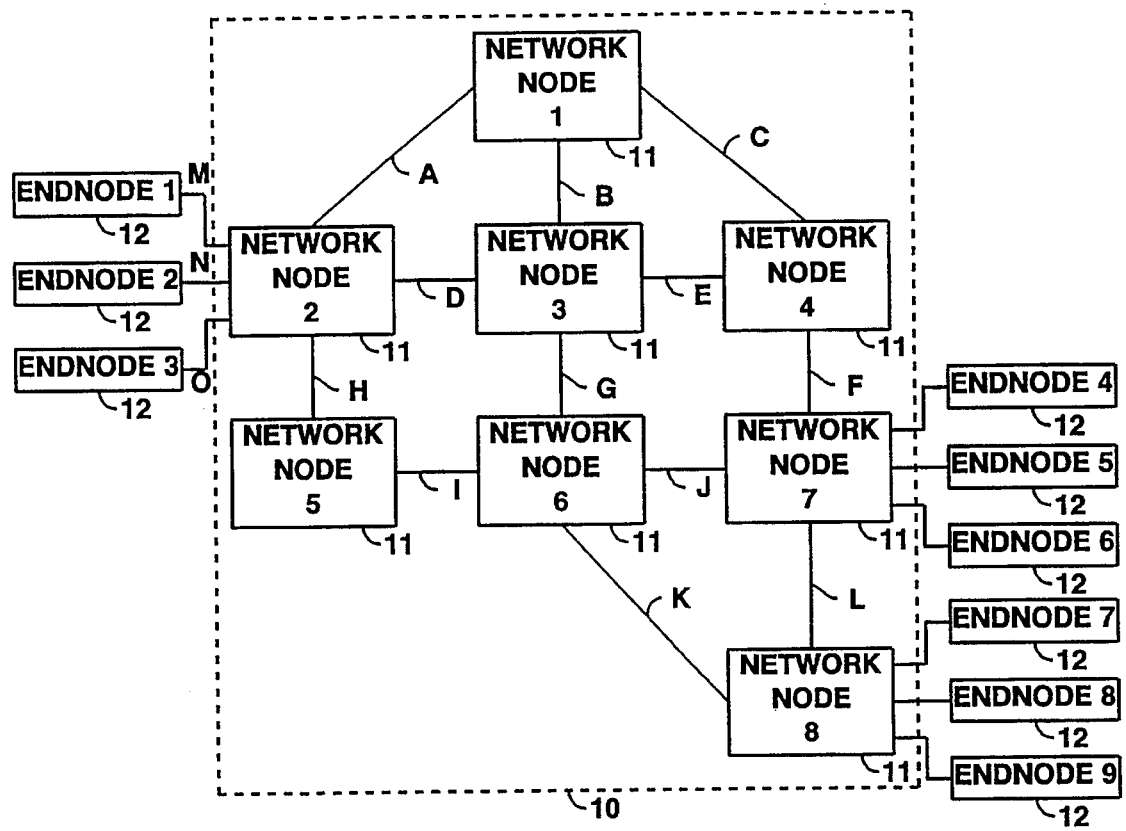
FIG. 1 shows a general block diagram of a packet communications system in which the wrap-around route testing protocol in accordance with the present invention might find use.

Referring more particularly to FIG. 1, there is shown a general block diagram of a packet transmission system 10 comprising eight network nodes 11 numbered 1 through 8. Each of network nodes 11 is linked to others of the network nodes 11 by one or more communication links A through L. Each such communication link may be either a permanent connection or a selectively enabled (dial-up) connection. Any or all of network nodes 11 may be attached to end nodes, network node 2 being shown as attached to end nodes 1, 2 and 3, network node 7 being shown as attached to end nodes 4, 5 and 6, and network node 8 being shown as attached to end nodes 7, 8 and 9. Network nodes 11 each comprise a data processing system which provides data communications services, in the form of time sequenced, fixed route sessions, to all connected nodes, network nodes and end nodes, as well as providing decision points within the node. The network nodes 11 each comprise one or more decision points within the node, at which point incoming data packets are selectively routed on one or more of the outgoing communication links terminated within that node or at another node. Such routing decisions are made in response to information in the header of the data packet. The network node also provides ancillary services such as the calculation of new routes or paths between terminal nodes, the provision of access control to packets entering the network at that node, and the provision of directory services and topology database maintenance at that node.

The network of FIG. 1 is preferably of the type known as High Performance Routing (HPR) systems utilizing connections, known as Rapid Transport Protocol (RTP) connections, calculated when initiating a session using the route. Once established, the RTP connection can be used to carry many sessions between the originating node and the destination node. This is accomplished by placing the routing information in the header of all data packets transmitted over that connection. In HPR systems, the calculated route for the connection is stored at both ends of the connection and used for transmission in both directions. The connection is "taken down," i.e., the route information vector discarded, only when the originating node terminates the session when no more data is available for transmission or when an acknowledgment is not received from the remote end of the connection within a pre-selected time-out period and a new path cannot be calculated.

Each of end nodes 12 comprises either a source of digital data to be transmitted to another end node, a utilization device for consuming digital data received from another end node, or both. Users of the packet communications network 10 of FIG. 1 utilize an end node device 12 connected to the local network node 11 for access to the packet network 10 or, in the alternative, users can be connected directly to one of network nodes 11. The local network node 11 translates the user's data into packets formatted appropriately for transmission on the packet network of FIG. 1 and generates the header which is used to route the packets through the network 10.

In order to transmit packets on the network of FIG. 1, it is necessary to calculate a feasible path or route through the network from the source node to the destination node for the transmission of such packets. This route is calculated in accordance with an algorithm that optimizes some network parameter such as throughput, quality of service, and so forth. One such optimal route calculating systems is disclosed in the aforementioned patent application Ser. No. 08/236,800, filed May 2, 1994. Once such a route is calculated, a connection request message is launched on the network, following the computed route and updating the usage of each link along the route to reflect the new connection. Data packets may then be transmitted along the calculated route from the originating node to the destination node, and back, by placing this route in the header of the data packet. It is to be noted that any of nodes 11 can be either an originating node or a destination node for a calculated route, and that such routes are calculated once at the establishment of the connection, stored at the originating and destination nodes, and thereafter used to route packets between the originating and destination nodes.

Figure 2:
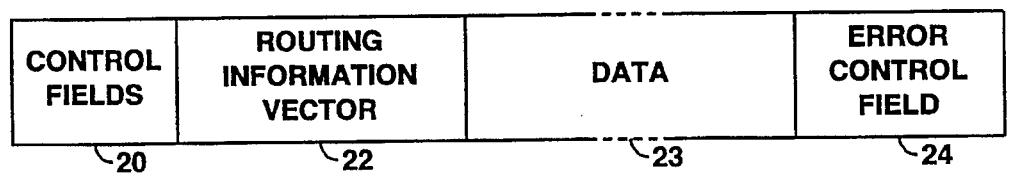
FIG. 2 shows a graphical representation of the header of a data message transmitted in a High Performance Routing network such as that shown in FIG. 1, in which a connection routing vector is used to route the message from the source node to the destination node, and which is also used to implement the wrap-around testing messages of the present invention.

In FIG. 2 there is shown a graphical representation of a data packet of the type to be launched from a source node in the network of FIG. 1 to a destination node in the network along a pre-calculated route. The data packet of FIG. 2 comprises control fields 20 which includes control information such as a connection identifier, packet size, transmission priority and other information necessary to properly process the data packet enroute and at the destination. Also included in the data packet of FIG. 2 is a routing information vector 22 which identifies, in order, each transmission leg in the route from the packet source node to the packet destination node. This vector is used along the route to select the next leg in the route. As will be discussed in detail hereinafter, this connection routing vector can also be used to control the generation of wrap-around route testing messages in accordance with the present invention. The third field of the packet of FIG. 2 is the data itself. The data field 23 includes not only the data itself, but also other information such as the nature of the data, data length, and so forth Finally, the last field of the packet of FIG. 2 is an error detection and/or correction field 24 used to detect and/or correct errors in the data packet of FIG. 2. As will be discussed hereafter, the data field 23 for wrap-around test messages might include a time stamp, a destination "wrap-around" node destination and a connection identifier, thereby permitting multiple simultaneous route testing from the same originating node.

Figure 3:
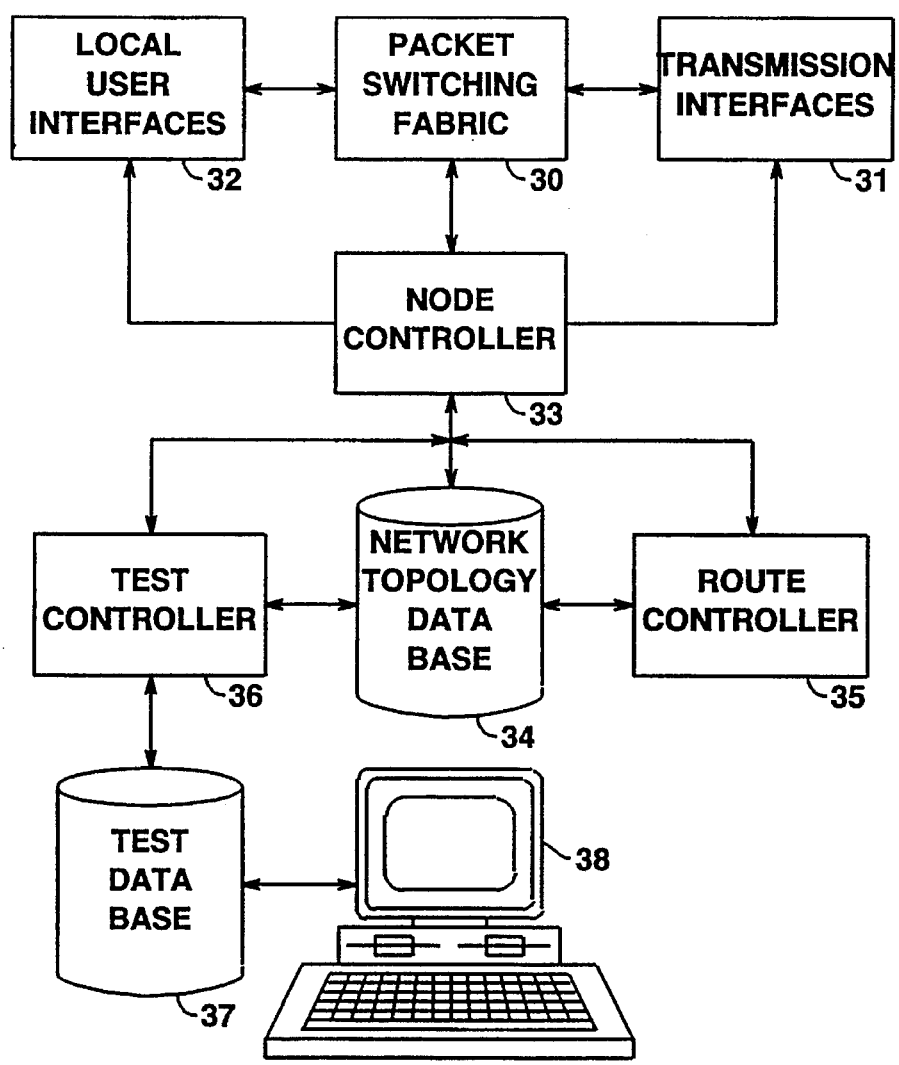
FIG. 3 shows a more detailed block diagram of typical decision point in the network of FIG. 1 at which point packets may enter the network or be forwarded along the route to a destination for each packet, and which a wrap-around test in accordance with the present invention might be initiated.

In FIG. 3 there is shown a general block diagram of a network node access circuit which might be found in one of the nodes 11 of FIG. 1. The node access circuit of FIG. 3 comprises a high speed packet switching fabric 30 onto which packets arriving at the node are entered. Such packets arrive over transmission links from other nodes of the network, such as links A–L of FIG. 1 via transmission interfaces 31, or are originated locally via local user interfaces 32. Switching fabric 30, under the control of node controller 33, connects each of the incoming data packets to the appropriate one of the outgoing transmission link interfaces 31 or the appropriate one of the local user interfaces 32, all in accordance with well known packet network operations. Each one of the data packets arriving at the node access circuit of FIG. 3 has the general form of the packet of FIG. 2. Indeed, network management packets are also formatted in the general form of the packets of FIG. 2. That is, each message, data or control message, transmitted on the network of FIG. 1 is routed by means of a routing vector in the header of the packet, as shown in FIG. 2.

When first establishing a connection, a route controller 35 is used to calculate optimum routes for messages originating at any of the endnodes connected to the network node 11 containing the access circuit of FIG. 3. Controller 35 uses updated information in network topology data base 34 to calculate the optimum route using an algorithm such as that described in the afore-mentioned application Ser. No. 08/236,800. In a High Performance Routing (RTP) network, once these Rapid Transport Protocol (RTP) routes are calculated, these optimum routes are stored at each end of the connection and added to the header (FIG. 2) of each packet transmitted on that connection. It can be seen that each and every packet launched from this node on the pre-calculated route to the desired destination follows the same identical path under the control of the routing vector 22 (FIG. 2). Occasionally, it becomes desirable to check this path for failures, congestion, et cetera. For example, if the performance of a particular route suddenly deteriorates (e.g., excessive delays or errors), it is desirable to identify the source of this deterioration in order to permit corrective action. It is toward the goal of checking such pre-calculated routes in a packet switching system that the present invention is directed.

In accordance with the present invention, a test controller 38 utilizes the routing information vector (field 22 of FIG. 2), previously calculated for a particular RTP connection, to test the performance of each node in the path of that connection. This is done by generating a plurality of wrap-around test messages to test each and every leg of the pre-calculated route. The resulting test data can be stored in test data base 37 and selectively viewed by a display device such as workstation 38. The operation of these wrap-around test messages can be better understood in connection with FIG. 4.

Figure 4:
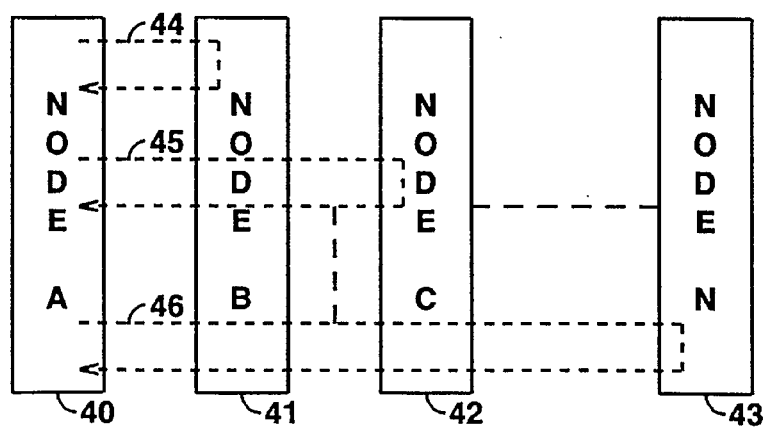
FIG. 4 shows in graphical form the routes of the multiple wrap-around test messages used to implement the route testing mechanism of the present invention.

Before proceeding to FIG. 4, it should be noted that the circuits of FIG. 3 can be realized as special purpose circuitry. In the preferred embodiment, however, all of the control functions described in connection with FIG. 4 are realized by programming a general purpose computer. The preparation of the programs necessary to accomplish these functions are obvious to persons of ordinary skill in the programmed packet network node art, particularly in view of the detailed flow charts to be described in connection with FIGS. 5 and 6.

In FIG. 4 there is shown a graphical representation of the wrap-around test messages of the present invention. Assuming that node 40 represents the originating node for a particular route, that node 43 is the terminating node for that route, and that nodes 41, 42, ... , are the intermediate nodes along that particular route. In accordance with the present invention, a plurality of wrap-around test messages 44, 45, ... , 46 are initiated at originating node 40. These wrap-around test messages all have the general form shown in FIG. 2. The data field 23 contains a time stamp representing the precise time message 44 is launched from node 40, a connection identification and the identification of the particular "wrap-around" node for which the particular test message is destined. Using the locally stored route vector 22, test controller 36 of FIG. 3 generates a first wrap-around message 44, having the first intermediate node 41 of the route vector as the first component of the routing vector of wrap-around message 44, and originating node 40 and the second and final component of the routing vector of message 44. When message 44 is received back at node 40, it is detected by test controller 36, and the precise time of its reception generated by test controller 36. The launching time and the reception time for message 44 are stored in test data base 37 and can be used to calculate the transit time from node 40 to node 41 simply by halving the difference between the launching and reception times.

Simultaneously with the generation of wrap-around message 44, test controller 36 also generates additional wrap-around messages 45 through 46, one for each intermediate node along the route and one for the destination node. Thus, if there are N nodes in the pre-calculated routes, then N wrap-around messages are generated, one for each of the nodes in the route. Of course, no test message need be generated for originating route 40. As each of these wrap-around test messages 45 through 46 are launched from originating node 40, the current time is added to the message, together with the connection identifier and the target node. When each of these messages 45 through 46 is received back at originating node 40, the then current time is noted and the launching times and the reception times for each wrap-around message are stored in test data base 37. As previously noted, the transit time to the particular destination node for each wrap-around message can be simply calculated as one-half the difference between the launching time and the corresponding reception time. The various wrap-around messages are each uniquely identified in the data fields 23 (FIG. 2) so that they can be properly correlated, i.e., the launch times associated with the appropriate return times. The transit times of the transmission legs between each adjacent pair of intermediate nodes in FIG. 4 can be calculated as the difference between the transit times to the two intermediate nodes immediately adjacent to that transmission leg. As taught in detail in the afore-mentioned co-pending application Ser. No. 08/236,800, these transit times can be processed to identify inoperative or failed nodes and/or transmission legs, abnormal response times of particular transmission legs and congestion at particular nodes.

It can be seen that the process for testing data routes in a packet transmission system described in connection with FIGS. 1–4 can be entirely implemented at a single node. That is, the route testing mechanism of the present invention requires no modification whatsoever to any portion of the network other than the originating node at which such testing facility is desired. This foreign node independence allows each node to be provisioned with wrap-around testing capability independent of all other nodes, permitting a gradual provisioning of the entire network and the provisioning of only those nodes of the network at which traffic can be initiated. Thus foreign node independence considerably reduces the cost of route testing as well a permitting gradual network outfitting for such testing. Finally, since the wrap-around test messages are treated as normal data packets, the nodes of the network are not required to carry out any overhead processing to support the testing procedures, thus increasing the efficiency of the overall network for the testing function.

Figure 5:
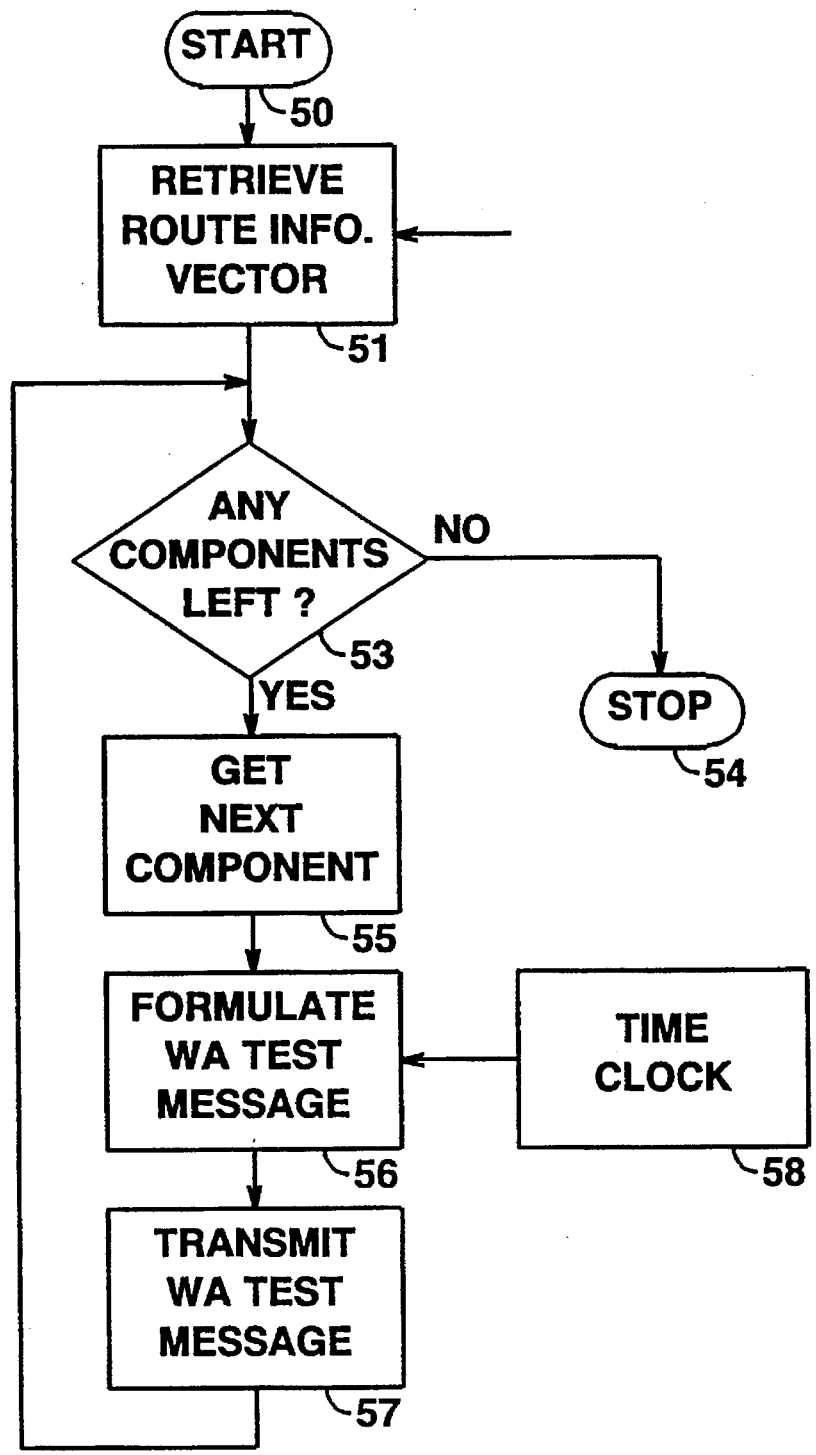
FIG. 5 shows a general flow chart of the process for transmitting the plurality of wrap-around test messages from the path originating node, used in implementing the present invention.

Referring more particularly to FIG. 5, there is shown a detailed flow chart of the process for launching one or more wrap-around test messages 44–46 of FIG. 4, implemented in the test controller 36 of FIG. 3. Starting in start box 50 of FIG. 5, box 51 is entered where the route vector for the route to be tested is retrieved from memory storage at the originating node. Decision box 53 is entered to determine if all of the components of the route information vector have already been processed. If not, box 55 is entered where the next component of the route vector is obtained. In box 56 this component is used to formulate a wrap-around (WA)

test message. The information in this test message includes the current time from time clock 58, a connection identifier, the target node and the routing information vector that describes the forward and reverse path that this particular message will take. Box 57 is then entered to launch the wrap-around test message formulated in box 56 onto the network, using the node controller 33, switching fabric 30 and transmission interfaces 31 of FIG. 3. Decision box 53 is then re-entered to determine if all of the components of the routing vector retrieved in box 51 have been processed. If not, the loop including boxes 55, 56 and 57 is traversed to launch a new wrap-around test message for the next component of the routing vector. When the last component of the routing vector has been processed to transmit a test message to the destination node, decision box 54 determines that this last component has been processed and terminal box 54 is entered to terminate the wrap-around test message generation process of FIG. 5. It can be seen that the process of FIG. 5 serves to generate and launch all of the test messages 44–46 of FIG. 4. Note that all of the wrap-around test messages are generated at a single originating node. As will be clear in connection with FIG. 6, the processing of these wrap-around test messages on their return will also be done at the same originating node. Thus the wrap-around tests of the present invention can be entirely implemented at a single node without modifying any other nodes of the network.

Referring then to FIG. 6, there is shown a detailed flow chart of the wrap-around test message reception process complementing the transmission process of FIG. 5. Starting in start box 60, box 61 is entered where a count of the number of wrap-around messages previously transmitted (via FIG. 5) for this route is obtained. This count will be used to monitor if and when all of the wrap-around test messages have been received. Decision box 62 is then entered to determine if a message reception time-out period has elapsed. That is, once all of the wrap-around test messages have been launched, a time-out period is initiated which represents an implementation-dependent period representing the maximum time the system will wait to receive the last wrap-around test message from the most remote node (e.g., node 43 of FIG. 4). If this time-out period elapses before the next test message is received, it is assumed that one or more test messages have been lost, probably due to a failure in the network. If, on the other hand, a wrap-around test message is received before the time-out of box 62 elapses, box 63 is entered to receive the next test message. In box 64, the launching time is extracted from the test message. In box 71, the current time is obtained from time clock 72, and in box 65 the round trip transit time to the target node is calculated as one-half the difference between the launch time and the reception time of the test message. Box 68 is then entered to decrement the message count (originally obtained in box 61) by one. In decision box 66, the count decremented in box 68 is tested to determine if the message count is zero. If not, decision box 62 is re-entered to await the next test message or the termination of the time-out period.

If the last test message has been processed, as determined by decision box 66 indicating a message count of zero, box 67 is entered to calculate all of the link transit times by subtracting transit times to the two immediately adjacent nodes, determined in box 65. Box 69 is then entered to display the results of the wrap-around route test. Finally, terminal box 70 is entered to terminate the process of FIG. 6.

If the time-out period of box 62 expires before all expected test messages have been received, as determined by decision box 62, box 71 is entered to identify the target node or nodes from which a wrap-around test message has not been returned. It can be assumed that, if a wrap-around message is lost, the packet was dropped due to congestion, or that a failure occurred in the target node or in the transmission link connecting the target node to the preceding node. Target nodes from which wrap-around test message have not been returned are displayed in box 69 and the process terminated in box 70. Using this displayed information, repair personnel can be dispatched or local administrators advised of the possibility of failure at or near that node.

The wrap-around route test described above is used to measure the routing performance of each node that is part of a route used for a particular RTP connection. The route test can be executed by the node at either end of the connection, but only one node can generate and process the route test messages. The results of the wrap-around tests of the present invention can be used to identify specific points of congestion along the connection, to analyze the overall performance of the network (for example, by determining if specific links need to be upgraded, added, deleted, etc.) and to determine if a particular node or link has failed completely.

What is claimed is:

1. A packet communications network comprising a plurality of network resources interconnected by transmission links;

means for determining at least one route through said network from a source resource to a destination resource in said network;

means for launching a wrap-around route testing messages on said network to said destination resource;

means for launching one or more wrap-around route testing messages on said network, one such route testing message for each of said resources in said route between said source resource and said destination resource;

means at said source resource for receiving each of said route testing messages; and means at said source resource for processing said route testing messages.

2. A packet transmission network according to claim 1 further comprising means in said source resource for inserting the current time in each of said route testing messages.

3. The network according to claim 1 further comprising means at said source resource for storing information concerning said wrap-around route testing messages.

4. The network according to claim 1 further comprising means at said source resource for displaying information concerning said wrap-around route testing messages.

5. The network according to claim 1 wherein said processing means comprises means for determining transit times to each of said resources in said route equal to one-half of the difference between the transmission time and the reception time of corresponding ones of said route testing messages.

6. The network according to claim 5 wherein said processing means further comprises means for determining the difference between said transit times for adjacent ones of said resources in said route.

7. The network according to claim 1 further comprising means for identifying failed ones of said resources.

8. A method for operating a packet communications network comprising the steps of interconnecting a plurality of network resources by a plurality of transmission links;

determining at least one route through said network from a source resource to a destination resource in said network;

launching a wrap-around route testing message onto said route to said destination resource;

launching one or more wrap-around route testing messages onto said route, one such route testing message for each of said resources in said route between said source resource and said destination resource;

receiving at said source resource each of said route testing messages; and processing said route testing messages at said source resource.

9. The method according to claim 8 further comprising the step of inserting the current time in each of said route testing messages at said source resource.

10. The method according to claim 8 further comprising the step of storing information concerning said wrap-around route testing messages at said source resource.

11. The method according to claim 8 further comprising the steps of displaying information concerning said wrap-around route testing messages at said source resource.

12. The method according to claim 8 wherein said processing step further comprises the step of determining transit times to each of said resources in said route equal to one-half of the difference between the transmission time and the reception time of corresponding ones of said route testing messages.

13. The method according to claim 12 wherein said processing step further comprises the step of determining the difference between said transit times for adjacent ones of said resources in said route.

14. The method according to claim 8 further comprising the step of identifying failed ones of said resources.

15. A route testing system for a packet communications network including a plurality of resources and utilizing pre-calculated routes through said network, said testing system being located at one of said resources and comprising means for launching a wrap-around route testing message on said network to the resource at the end of said route;

means for launching one or more wrap-around route testing messages on said network, one such route testing message for each of said resources in said route;

means for receiving each of said route testing messages; and means for processing said route testing messages.

16. A testing system according to claim 15 further comprising means for inserting the current time in each of said route testing messages.

17. The testing system according to claim 15 further comprising means for storing information concerning said wrap-around route testing messages.

18. The testing system according to claim 15 further comprising means for displaying information concerning said wrap-around route testing messages.

19. The testing system according to claim 15 wherein said processing means comprises means for determining transit times to each of said resources in said route equal to one-half of the difference between the transmission time and the reception time of corresponding ones of said route testing messages.

20. The testing system according to claim 19 wherein said processing means further comprises means for determining the difference between said transit times for adjacent ones of said resources in said route.

21. The testing system according to claim 15 further comprising means for identifying failed ones of said resources.

\* \* \* \* \*